(12) United States Patent
Barrett et al.

(10) Patent No.: US 9,546,755 B2
(45) Date of Patent: Jan. 17, 2017

(54) ACCESSORY MOUNTING SYSTEM

(71) Applicant: Sport Scope Inc., Spokane, WA (US)

(72) Inventors: Andrew N. Barrett, Coeur d' Alene, ID (US); Brent Condie, Worley, ID (US)

(*) Notice: Subject to any disclaimer, the term of this patent is extended or adjusted under 35 U.S.C. 154(b) by 57 days.

(21) Appl. No.: 14/120,339

(22) Filed: May 14, 2014

(65) Prior Publication Data

US 2014/0339380 A1  Nov. 20, 2014

Related U.S. Application Data

(60) Provisional application No. 61/823,190, filed on May 14, 2013.

(51) Int. Cl.
| | |
|---|---|
| *B65D 88/00* | (2006.01) |
| *F16M 11/28* | (2006.01) |
| *F16M 13/02* | (2006.01) |
| *G08B 13/196* | (2006.01) |

(52) U.S. Cl.
CPC .............. *F16M 11/28* (2013.01); *F16M 13/02* (2013.01); *G08B 13/19632* (2013.01)

(58) Field of Classification Search
USPC .................. 248/125.8, 125.9, 157, 534, 535, 538,248/539, 540, 541; 220/1.5
See application file for complete search history.

(56) References Cited

U.S. PATENT DOCUMENTS

| | | |
|---|---|---|
| 4,593,877 A | 6/1986 | van der Wyk |
| 4,828,308 A | 5/1989 | Riedl |
| 6,768,474 B2 | 7/2004 | Hunt |
| 6,971,617 B2* | 12/2005 | Nguyen ................ A61G 13/101 211/172 |
| 7,464,504 B2 | 12/2008 | Hartzell et al. |
| 7,506,775 B2 | 3/2009 | Hartzell et al. |
| 8,590,080 B1* | 11/2013 | Staresinic ............ A47C 20/023 248/125.9 |
| 8,950,723 B1* | 2/2015 | Fogelstrom ............ A45B 11/00 135/16 |
| 8,979,045 B2* | 3/2015 | Petrakis ................ A47B 37/04 248/205.1 |
| 2009/0321590 A1* | 12/2009 | Keller ..................... E05B 83/02 248/125.8 |
| 2011/0193765 A1* | 8/2011 | Wang ....................... H01Q 1/10 343/882 |
| 2013/0056991 A1 | 3/2013 | Petersen et al. |

* cited by examiner

*Primary Examiner* — Steven Marsh
(74) *Attorney, Agent, or Firm* — Lee & Hayes, PLLC (57) ABSTRACT

An accessory mounting system comprises a vertically aligned bracket configured to mate with a top corner block and a bottom corner block disposed below the top corner block of a pre-configured shipping container. A shaft may mount to the vertically aligned bracket and may have a first section slidable into a second section. In some examples, an accessory may be coupled to the shaft. The accessory may be elevated above a top plane of the pre-configured shipping container when the first section is slid at least partially out of the second section and the accessory mounting system is in an extended position. The accessory may be disposed next to the pre-configured shipping container when the first section is slid at least partially into the second section and the accessory mounting system is in a retracted position.

20 Claims, 6 Drawing Sheets

ACCESSORY MOUNTING SYSTEM

This application claims priority to U.S. Provisional Application No. 61/823,190, filed May 14, 2013, the entire contents of which are incorporated herein by reference.

BACKGROUND

Pre-configured shipping containers, such as International Organization for Standardization (ISO) compliant containers, have many uses. For instance, pre-configured shipping containers may be shipped to and setup at a remote site for use as portable shelters. Military camps (e.g., field offices, field hospitals, barracks, kitchens, mess halls, command posts, etc.) disaster relief shelters, decontamination stations, holding cells, communication centers, laboratories, and schools are just some remote sites that may implement pre-configured shipping containers. Some shipping containers have pre-configured corner blocks for lifting the containers and, in some instances, linking the containers together during shipping and/or storage.

When establishing a remote site, additional layers of infrastructure may also be setup. For instance, a security system, a power system, a communication system, a plumbing system, and/or the like may be shipped to the remote site and setup to establish a fully functioning remote site.

The additional infrastructure layers often include additional hardware and/or supporting structures (e.g., tripods, trailers, booms, towers, weighted base foundations, etc.), adding to the total amount of equipment and weight to be shipped. Furthermore, remote sites are often reconfigured, upgraded, and/or relocated. Once setup, some additional infrastructure equipment may be difficult to access and modify, making reconfigurations burdensome.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, existing systems often add substantial weight for shipping and are often difficult to reconfigure. Accordingly, there is a need for improved equipment installation systems that use pre-configured shipping-containers. In particular, there is a need for improved methods and apparatuses for mounting an accessory to a pre-configured shipping container.

This disclosure is directed to an accessory mounting system comprising a bracket configured to couple to a top corner block and a bottom corner block of a pre-configured shipping container, such as an ISO shipping container. The bracket may comprise an elongated body vertically aligned along a side of the ISO shipping container when attached to the ISO shipping container.

In some examples, an accessory may mount to the ISO shipping container via the vertically aligned bracket. For instance, the accessory may couple to a shaft comprising multiple, telescoping sections. The shaft may couple to the vertically aligned bracket at one or more coupling points. In some instances, the shaft may pivotably couple to the vertically aligned bracket so that the accessory can be easily accessed by tilting the shaft. Furthermore, locking components may be disposed on the pre-configured shipping container, the vertically aligned bracket, the telescoping shaft, and/or the accessory for securing any of the aforementioned components in place.

In some embodiments, the accessory may be communicatively coupled to an additional piece of equipment housed within the pre-configured shipping container. For instance, the accessory and/or the additional equipment may comprise a portion of an additional layer of infrastructure assembled onto and/or into the pre-configured shipping container. By way of example and not limitation, the accessory may comprise a light fixture and the additional equipment may comprise a power source and/or a switch coupled to the light fixtures. A conduit may be disposed in and/or on the shaft to route a wire from the accessory to the pre-configured shipping container.

In some examples, the accessory mounting system may be adjustable between an extended position and a retracted position. In the extended position, the retracted position, or both positions, the pre-configured shipping container may comprise a base support, securely transferring a weight load from the accessory mounting system to the ground. In some examples, the accessory mounting system may provide access to the accessory when the accessory mounting system is in the retracted position. For instance, when in the retracted position, the accessory may be positioned close enough to the ground that it may be reached by a user for installation, uninstallation, repairs, upgrades, inspection, etc.

Multiple and varied example implementations and embodiments are described throughout. However, these examples are merely illustrative and other implementations and embodiments of an accessory mounting system may be implemented without departing from the scope of the disclosure. For instance, the implementations, or portions thereof, may be rearranged, combined, used together, duplicated, partially omitted, omitted entirely, and/or may be otherwise modified to arrive at variations on the disclosed implementations.

Illustrative Accessory Mounting System

Figure 1A:
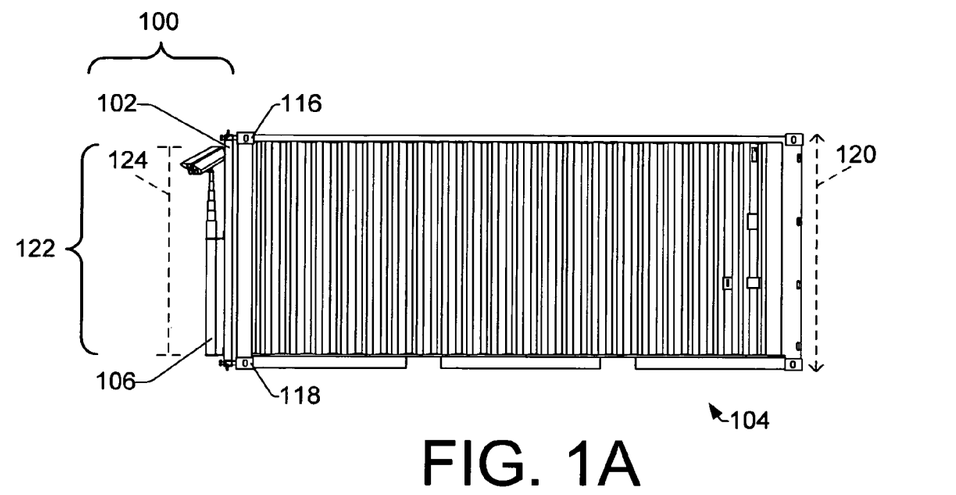
FIG. 1A illustrates an example accessory mounting system in a retracted position.
Figure 1B:
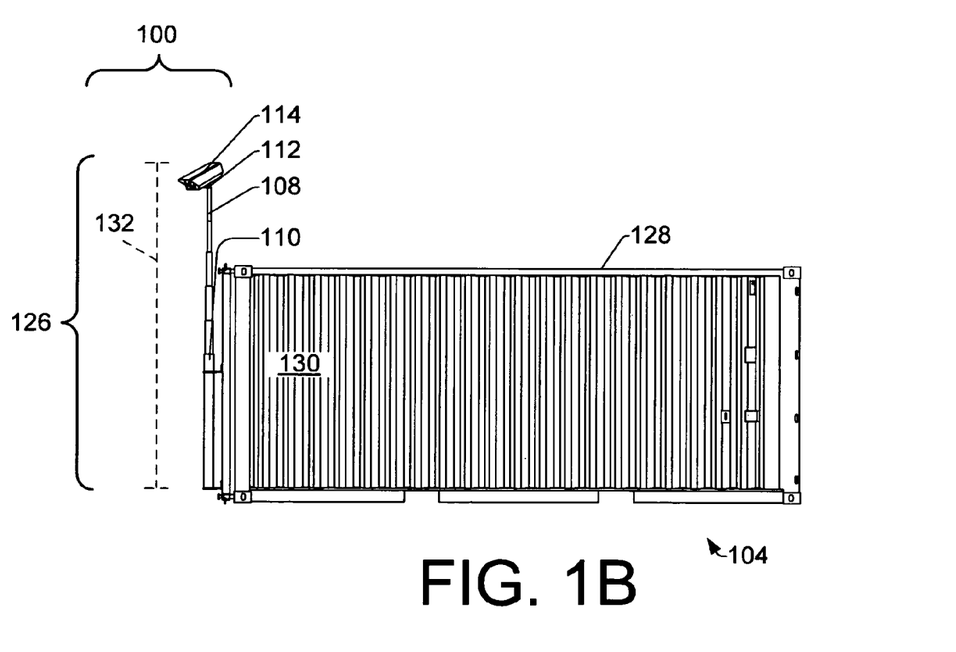
FIG. 1B illustrates an example accessory mounting system in an extended position.

FIGS. 1A and 1B illustrate an example accessory mounting system 100 comprising a vertical bracket 102 coupled to a pre-configured shipping container 104. The accessory mounting system 100 may comprise a shaft 106 coupled to the vertical bracket 102. The shaft 106 may comprise a telescoping shaft having at least a first section 108 slidable into a second section 110. The first section 108 may connect directly to the second section 110 or any number of slidable sections may connect the first section 108 to the second section 110. The first section 108 may comprise an accessory coupling area, zone, and/or mechanism 112. An accessory 114 may attach to first section 108 of the shaft 106 at the accessory coupling mechanism 112.

In some examples, the accessory mounting system 100 may attach the accessory 114 to the pre-configured shipping container 104 at a corner of the pre-configured shipping container 104, and orient the accessory 114 vertically. For instance, the vertical bracket 102 may couple to a top corner block 116 of the pre-configured shipping container 104 and to a bottom corner block 118 of the pre-configured shipping container 104. The top corner block 116 may be disposed above the bottom corner block 118 such that the vertical bracket 102 is positioned vertically when mounted to the top and bottom corner blocks 116 and 118. The vertical bracket 102 may be positioned parallel to a height dimension 120 of the pre-configured shipping container 104 and/or perpendicular to the ground.

FIG. 1A illustrates the example accessory mounting system 100 in a retracted position 122. In the retracted position 122, the first section 108 of the shaft 106 may be at least partially disposed in the second section 110. For instance, the first section 108 may have a cross-section slightly smaller than a cross-section of the second section 110, yet substantially similar in shape such that the first section 108 may be at least partially slid into and out of the second section 110.

In some embodiments, the shaft 106 may have a retracted height dimension 124 when the mounting system 100 is in the retracted position 122. For instance, the first section 110 may be at least partially slid into the second section 114 such that the shaft 106 is more compact in the retracted position 122 than when the mounting system 100 is in an extended position 126. While in the retracted position 122, the shaft 106 may provide better access to the accessory 114 by users than when the mounting system 100 is in the extended position 126. In some instances, the accessory coupling mechanism 112 and/or the accessory 114 may be disposed below a top or ceiling plane 128 of the pre-configured shipping container 104 when the mounting system 100 is in the retracted position 122. The accessory coupling mechanism 112 and/or the accessory 114 may be disposed next to or adjacent to a side wall 130 of the pre-configured shipping container 104 when the mounting system 100 is in the retracted position 122. In some instances, a user may have access to the accessory coupling mechanism 112 and/or the accessory 114 when the mounting system 100 is in the retracted position 122 to install, uninstall, upgrade, retrofit, repair, remove, change, and/or examine the accessory 114.

FIG. 1B illustrates the example accessory mounting system 100 in the extended position 126. In the extended position 126, the first section 108 may at least partially slide out of the second section 110, giving the shaft 106 an extended height dimension 132 that is greater than the retracted height dimension 124. In the extended position 126, the accessory 114 may be disposed at least partially above the ceiling plane 128 of the pre-configured shipping container 104. In some instances, the accessory 114 may be elevated above the pre-configured shipping container 104 when the mounting system 100 is in the extended position 126. The accessory 114 may be activated and/or functional when the mounting system 100 is in the extended position 126. For instance, the accessory 114 may comprise a surveillance camera that reaches an acceptable field of vision for security purposes once the mounting system 110 is adjusted to the extended position 126. Additionally or alternatively, the accessory 114 may be activated and/or functional when the mounting system 100 is in the retracted position 122.

In some examples, the vertical bracket 102 may transfer a weight load from the accessory 114 and/or the shaft 106 to the pre-configured shipping container 104 via the top and bottom corner blocks 116 and 118. For instance, the pre-configured shipping container 104 may comprise a base to provide foundational support for the accessory 114 when the accessory 114 is elevated above the pre-configured shipping container 104 and/or when the mounting system 100 is in the extended position 126 and/or the retracted position 122. In some examples, coupling to the pre-configured shipping container 104 at a top corner block 116 and a bottom corner block 118 may provide a more effective weight load transfer than coupling at a single corner block or a single location on the pre-configured shipping container 104.

FIGS. 2A-2D illustrates multiple embodiments of a vertical bracket 200, which may be implemented in an accessory mounting system. Any features discussed in any of the embodiments may be duplicated, omitted, and/or combined with any features of any other embodiments.

Figure 2A:
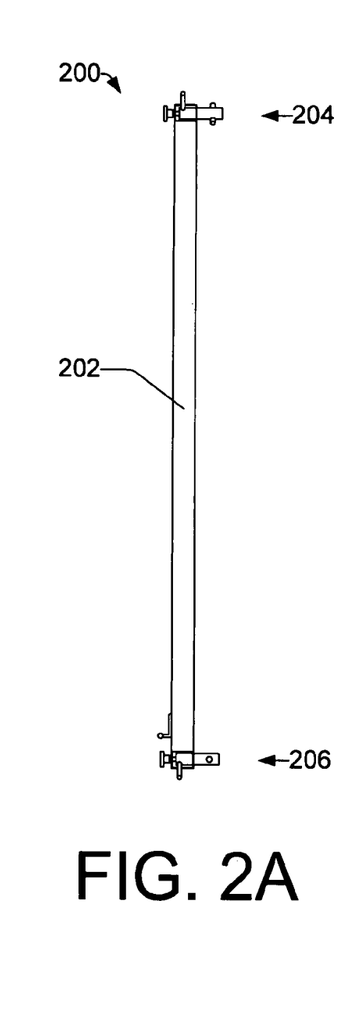
FIGS. 2A-2D illustrate multiple embodiments of a vertical bracket which may be implemented in an accessory mounting system.

FIG. 2A illustrates the vertical bracket 200 may comprising an elongated body 202 with a first attachment mechanism 204 disposed at a first end of the body 202 and a second attachment mechanism 206 disposed at a second end of the body 202, distal and/or opposite from the first end. The first and/or second attachment mechanisms 204 and/or 206 may provide a quick and convenient method for attaching and/or unattaching the vertical bracket 200 to a pre-configured shipping container. In some instance, the first and/or second attachment mechanisms 204 and/or 206 may removably couple the vertical bracket 200 to the pre-configured shipping container. In other instances, the first and/or second attachment mechanisms 204 and/or 206 may permanently couple the vertical bracket 200 to the pre-configured shipping container. A locking mechanism, such as a padlock, (not shown) may be implemented to secure the vertical bracket 200 to the pre-configured shipping container.

Figure 2B:
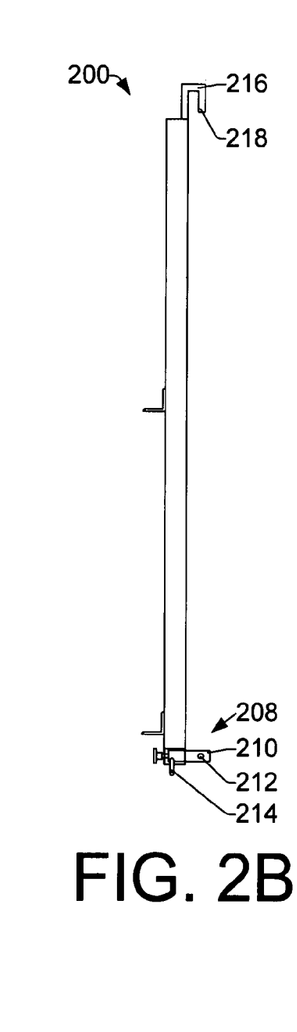

FIG. 2B illustrates the vertical bracket 200, wherein the first attachment mechanism 204 and/or the second attachment mechanism 206 may comprise a pin-actuated bolt 208. The pin-actuated bolt 208 may be configured to mate with a pre-configured corner block of the pre-configured shipping container. The pin-actuated bolt 208 may comprise an insertion member 210 with locking protrusions 212 rotatable via a pin 214. The pin-actuated bolt 208 is discussed in greater detail below with regard to FIG. 4.

In some embodiments, the first attachment mechanism 204 and/or the second attachment mechanism 206 may comprise a hook 216. For instance, the first attachment mechanism 204 may comprise the hook 216 with a downward facing member 218 that may slide into the top corner block of the pre-configured shipping container, such that the vertical bracket may hang, held in place by gravity.

Figure 2C:
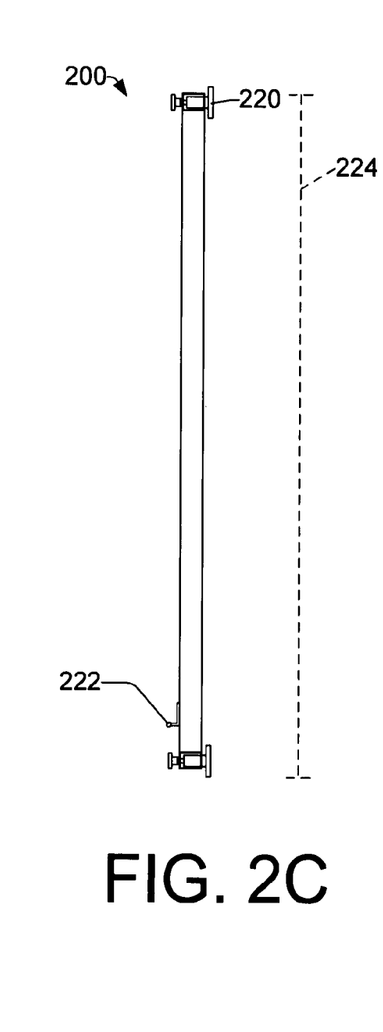

FIG. 2C illustrates the vertical bracket 200, wherein the first attachment mechanism 204 and/or the second attachment mechanism 206 may comprise a magnet 220. The magnet 220 may comprise a ferromagnetic material with a suitable magnetic field to secure the vertical bracket 200 to the pre-configured shipping container. In some embodiments, the magnet 220 may comprise an electromagnet communicatively coupled to a power source. The first attachment mechanism 204 and/or the second attachment mechanism 206 may comprise other types of coupling devices suitable for securely fastening the vertical bracket 200 to the pre-configured shipping container and transferring a weight load from the vertical bracket 200 to the pre-configured shipping container.

In some embodiments, the vertical bracket 200 may comprise the elongated body 202. The elongated body 202 may have material with a constant or varying cross section along the length. For instance, the elongated body may comprise a rounded, curved, circular, triangular, square, rectangular, regular, and/or irregular cross section. The cross section may be constant throughout the length of the elongated body 202 or the cross section may vary throughout the length of the elongated body 202. In some examples, the elongated body 202 may comprise a rigid material, such as metal (e.g., aluminum, steel, alloys, etc.), wood, polymers (e.g., plastic), ceramics, glass, fiber-glass, carbon-fiber, composites thereof, and/or combinations thereof. The elongated body may comprise any material that may adequately transfer a weight load from an accessory on a shaft to the preconfigured shipping container via the first and second attachment mechanisms 204 and 206.

In some examples, the elongated body 202 may comprise a shaft coupling area, zone, or mechanism 222 for attaching a shaft (e.g., a telescoping shaft with an accessory) to the vertical bracket 200. The shaft coupling mechanism 222 may be disposed on the elongated body 202 at any position. For instance, the shaft coupling mechanism 222 may be disposed proximate to a center of the vertical bracket 200, proximate to the first attachment mechanism 204, or proximate to the second attachment mechanism 206. In some examples, the elongated body 202 may comprise multiple shaft coupling mechanisms 222 for coupling the shaft to the vertical bracket. The shaft coupling mechanism 222 may comprise a quick-release collar, a pin, a magnet, a bolt, or any other type of coupling mechanism.

Figure 2D:
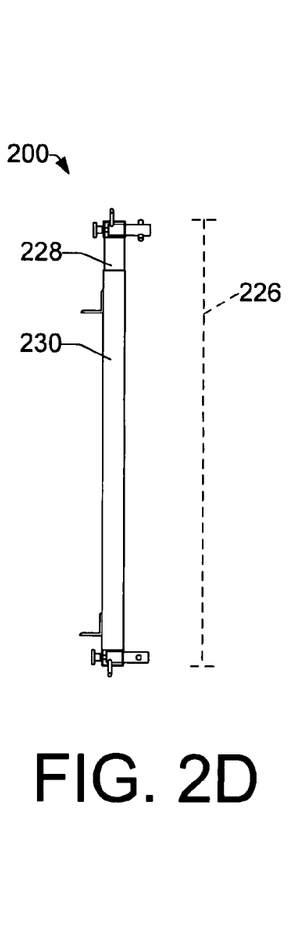

As illustrated in FIGS. 2C and 2D, the elongated body 202 may have a first length 224 for use with the pre-configured shipping container, and a second length 226 for when the vertical bracket 200 is not in use (e.g., in storage). For instance, the vertical bracket 200 may comprise a first portion 228 slidable into a second portion 230. In this way, the shaft and/or the vertical bracket 200 may comprise telescoping properties.

Figure 3:
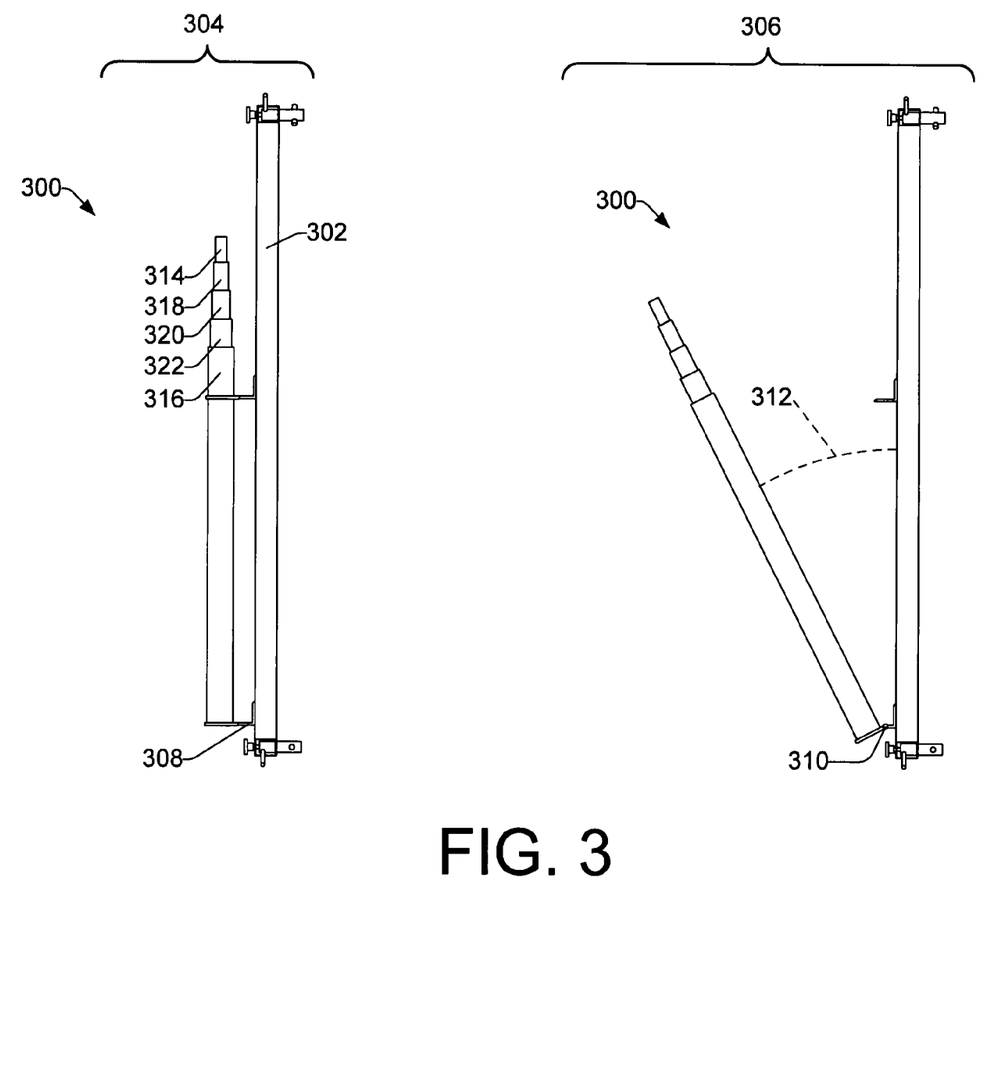
FIG. 3 illustrates a shaft mountable to a vertical bracket in a first position and in a second position.

FIG. 3 illustrates a shaft 300 coupling to a vertical bracket 302 in a first position 304 and in a second position 306. As discussed above, the shaft 300 may couple to the vertical bracket 302 at one or multiple shaft coupling mechanisms 308. In some instances, the shaft coupling mechanism 304 may securely position the shaft 300 substantially parallel to the vertical bracket 302. In some examples, the shaft coupling mechanism 304 may comprise an electrical contact in electrical communication with an accessory disposed on the shaft 300.

In some embodiments, the shaft 300 may couple to the vertical bracket 302 at a pivot axis 310. For instance, the shaft 300 may be pivotable from a position substantially parallel to the vertical bracket 302, such as the first position 304, to a position forming an angle 312 between the vertical bracket 302 and the shaft 300, such as the second position 306. In some examples, the pivot axis 310 may provide access to an accessory mounted to the shaft 300 without requiring removal of the shaft 300 from the vertical bracket 302. In other examples, the shaft 300 may be statically disposed in the first position 304 or the second position 306.

In some examples, the shaft 300 may comprise a first section 314 slidable into a second section 316. The shaft 300 may further comprise a third section 318, a fourth section 320, a fifth section 322, and so on, slidable into each other. The shaft 300 may comprise any number of slidable sections such that the shaft may have an extended length substantially greater than a retracted length. The shaft 300 may comprise any of the materials discussed above with regard to the vertical bracket 302. The shaft 300 may comprise a same material as the vertical bracket 302, a different material as the vertical bracket 302, or a combination thereof.

Figure 4:
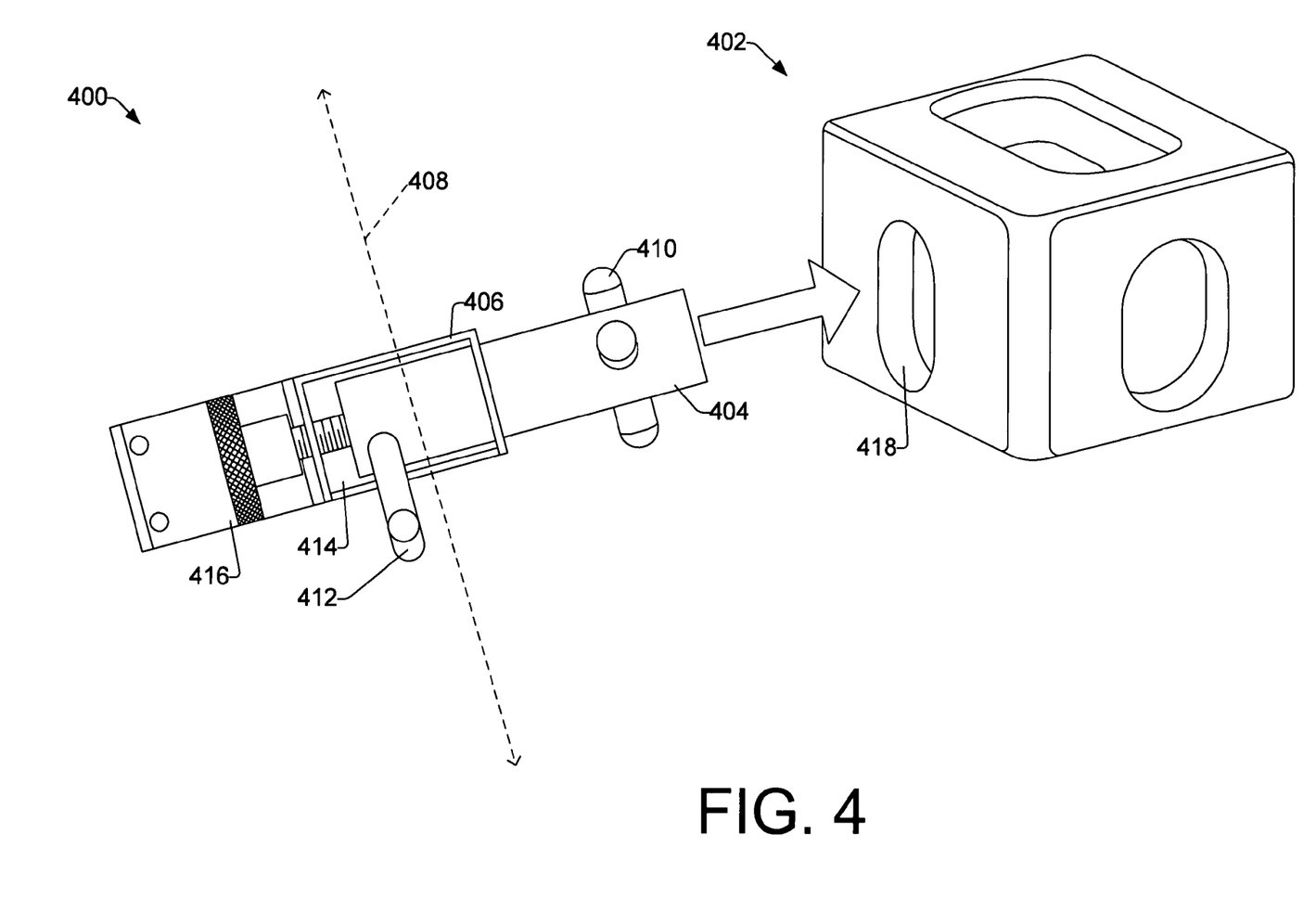
FIG. 4 illustrates an example pin-actuated bolt for coupling a vertical bracket to a pre-configured corner block.

FIG. 4 illustrates an example pin-actuated bolt 400 for coupling a vertical bracket to a corner block 402 of a pre-configured shipping container. The corner block 402 may be a preconfigured corner block with standardized dimensions and/or features. The pin-actuated bolt 400 may comprise an insertion member 404 extending out a bolt housing 406 perpendicular to a longitudinal axis 408 of the vertical bracket. The insertion member 404 may have one or multiple locking protrusions 410 protruding radially outward from a side of the insertion member 404. A pin 412 may also extend outward from a side of the insertion member 404, through an access window 414 of the bolt housing 406. A screw-knob 416 may extend from the bolt housing 406 from an end distal or opposite from the insertion member 404.

In some embodiments, the pin-actuated bolt 400 may removably couple to the corner block 402. The insertion member 404 may pass through an aperture 418 on the corner block 402. Applying a force to the pin 412 may rotate the insertion member 404 and the one or multiple locking protrusions 410 until the one or multiple locking protrusions 410 makes contact with an interior surface or feature of the corner block 402. The pin-actuated bolt 400 may then be secured in place by twisting the screw-knob 416, applying a force that pulls the insertion member 404 towards the screw-knob 416, and securing the locking protrusions 410 against the interior surface or features of the corner block 402. The pin-actuated bolt 400 may be removed from the corner block 402 by twisting the screw-knob 416 in the opposite direction, loosening the locking protrusions 410 from the interior surface or features of the corner block 402.

Figure 5:
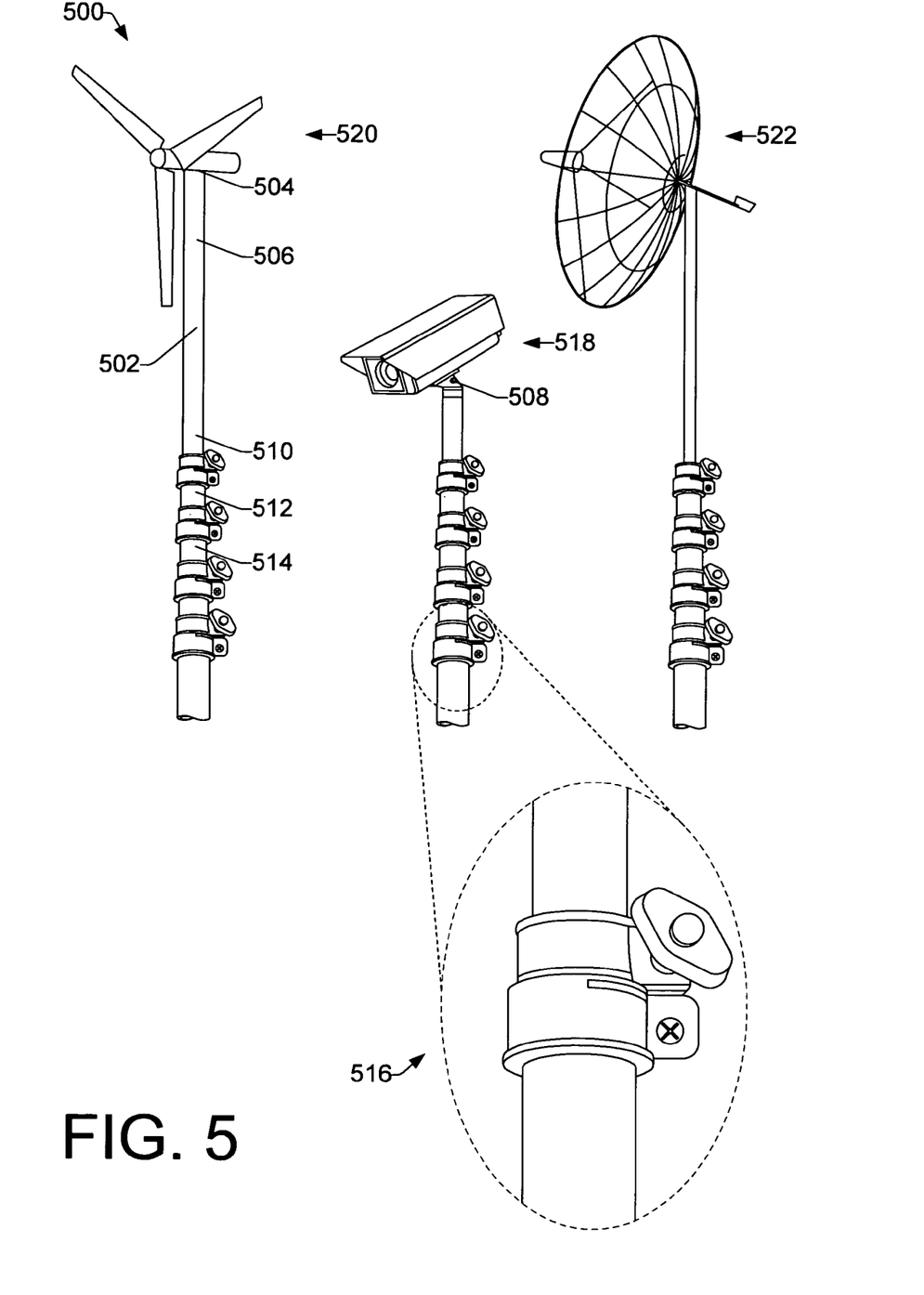
FIG. 5 illustrates multiple examples of an accessory coupled to a shaft comprising a first section slidable into a second section.

FIG. 5 illustrates multiple embodiments of an accessory 500 coupled to a shaft 502. In some examples, the accessory 500 may couple to the shaft 502 at an end 504 of a first section 506 of the shaft 502 via an accessory coupling mechanism 508. The accessory coupling mechanism 508 may comprise any of the coupling mechanisms discussed above with regard to the vertical bracket and/or the shaft 500. The accessory coupling mechanism 508 may be disposed at the end 504 of the first section 506 or at a different position on the first section 506, such as on a side of the first section 506.

In some examples, the shaft 502 may comprise the first section 506 slidable into a second section 510. Furthermore, the second section 510 may be slidable into a third section 512, which may be slidable into a fourth section 514. Any number of slidable sections may be implemented to provide telescoping functionality to the shaft 502. In some embodiments, the accessory coupling mechanism 508 and/or the accessory 500 may be disposed on any portion of any of the slidable sections, or anywhere else on the shaft 502. The accessory coupling mechanism 508 may comprise electrical contacts for coupling the accessory 500 to a wire, the wire is discussed in greater detail below. In some examples, a locking collar 516 may be disposed on or between each of the slidable sections to secure the slidable sections in a selected position (e.g., extended, retracted, partially extended, etc.) relative to each other.

In some embodiments the accessory 500 may comprise a camera 518. For instance, the accessory 500 may comprise a security camera and/or an infrared camera for monitoring an area in the vicinity of the accessory mounting system. In some examples, the accessory 500 may comprise a power generating device, such as a wind turbine 520, a solar cell, a chargeable battery, and the like. In some embodiments, the accessory 500 may comprise a communication device, such as a satellite 522, an antennae, a transponder, a radar emitter, a transmitter, a receiver, a transceiver, and the like. In some examples, the accessory 500 may comprise a light, a sensor (e.g., a weather or environmental sensor), an indicator (e.g., a sign, a flag, location marker, etc.), and/or a portion of a communication system, a power system, an environmental sensing system, and/or a surveillance system. The accessory 500 may comprise a single accessory or a combination of accessories.

Figure 6:
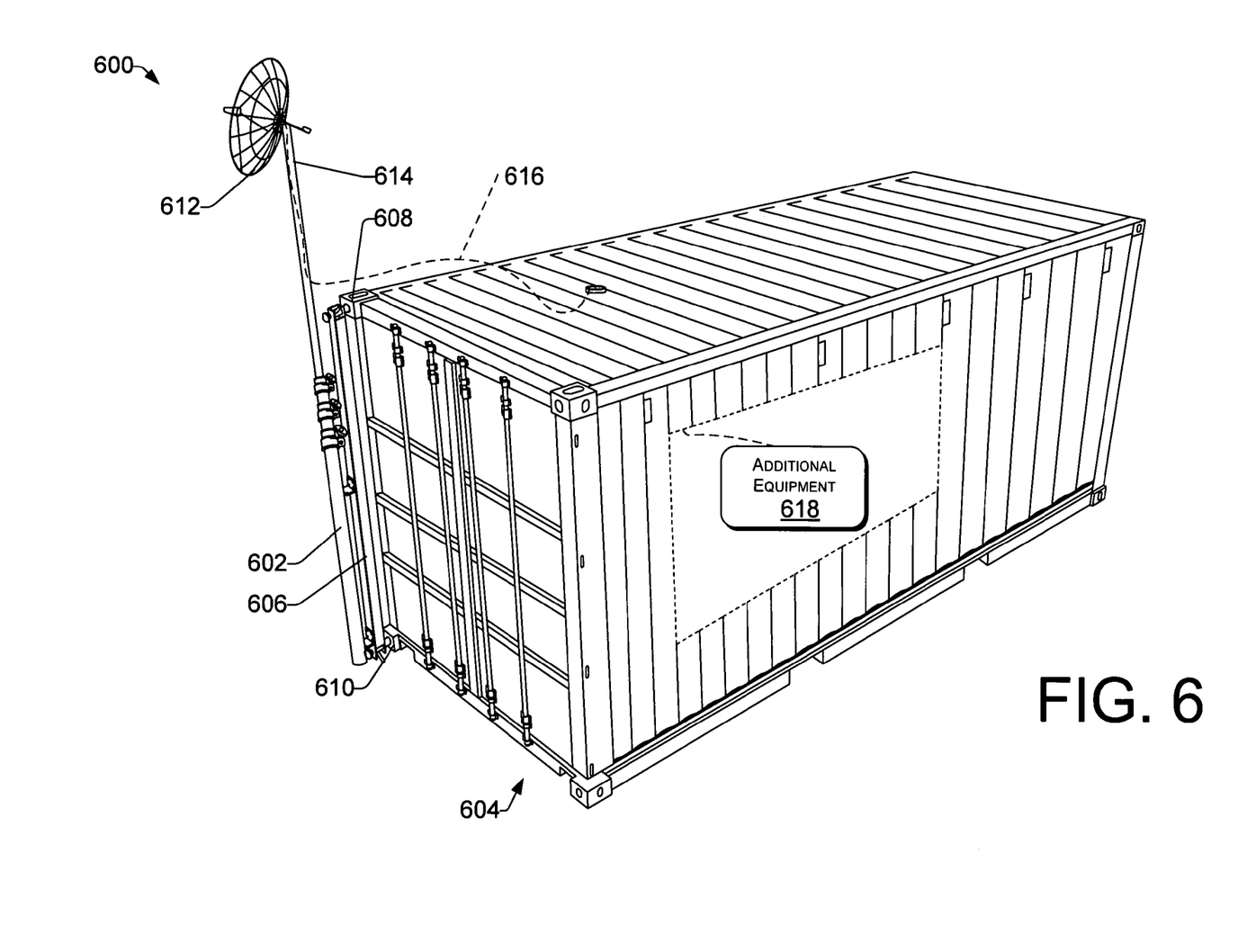
FIG. 6 illustrates an example accessory mounting system comprising an accessory communicatively coupled to equipment housed in a pre-configured shipping container.

FIG. 6 illustrates an example accessory mounting system 600 comprising a shaft 602 mounted to a pre-configured shipping container 604 via a vertical bracket 606. In some instances, the vertical bracket 606 may removably couple to the shipping container 604 at a top corner block 608 and the bottom corner block 610 using any of the aforementioned coupling methods and features.

In some instances, an accessory 612 may couple to the shaft 602. The accessory 612 may include an assortment of electrical and/or mechanical components. In some instances, the shaft 602 may comprise a conduit 614 for routing a wire 616 or multiple wires. For example, the wire 616 may couple to one of the electrical and/or mechanical components of the accessory 612 and pass into the conduit 614 for routing. The conduit 614 may guide the wire 616 from the accessory 612 in a direction towards the vertical bracket 606. The conduit 614 may be disposed within the shaft 602, such as in a hollow portion of one of or multiple slidable sections of the shaft 602. In some examples, the conduit 614 may be disposed on an exterior of the shaft 602. For instance, the conduit 614 may comprise wire management guides or loops. In some examples, the conduit 614 may be at least partially disposed within the shaft 602 and/or at least partially disposed external to the shaft.

In some instances, the wire 616 may exit the conduit 614 and enter the pre-configured shipping container 602, where it may communicatively couple to an additional piece of equipment 618 housed within the pre-configured shipping container 604. For example, the accessory 612 may comprise a satellite dish and the additional equipment 618 may comprise a receiver communicatively coupled to the satellite dish. In another example, the accessory 612 may comprise a wind turbine or solar cell and the additional equipment 618 may comprise a battery cell receiving charging power from the accessory 612. In another example, the accessory 612 may comprise a camera and the additional equipment 618 may comprise a monitor to display an image captured by the camera. In another example, the accessory 612 may comprise a light fixture and the additional equipment 618 may comprise a power supply and/or a switch coupled to the light fixture. Any variation or combination of accessories and additional equipment may be implemented.

In some embodiments, the accessory 612 may communicatively couple to the additional equipment 618 wirelessly. For instance, the accessory 612 may comprise an electrical or mechanical component including a receiver, transmitter, and/or transceiver in communication with the additional equipment 618. In some examples, the accessory 612 may comprise a Bluetooth, Wi-Fi, cellular, or other wireless communication apparatus communicatively coupled to a corresponding communication apparatus of the additional equipment 618. In some examples, the additional equipment 618 may provide wireless control over the accessory 612. The additional equipment 618 may receive data through a wireless communication channel from the accessory 612.

In some examples, the accessory mounting system 600 may provide a stable foundation for the accessory 612 by transferring a weight load of the accessory 612 to the pre-configured container 604 through the top and bottom corner blocks 608 and 610. In some examples, coupling the vertical bracket 606 to the pre-configured shipping container 604 at two vertically aligned points may provide weight distribution system that supports an accessory weight load of about 20 to about 30 lbs. In some examples, an accessory weight load of up to 120 lbs. may be supported by the accessory mounting system 600. In other examples, any amount of weight may be supported.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A telescoping mast system for mounting to a pre-configured container:
    a mounting bracket with a body having a first attachment mechanism disposed at a first end of the body and configured to attach to a first corner of the container, and a second attachment mechanism disposed at a second end of the body and configured to attach to a second corner of the container;
    a shaft comprising a first section that is slidable into a second section, the shaft coupling to the body of the mounting bracket; and
    an accessory coupling mechanism disposed on the first section of the shaft.

2. The telescoping mast system of claim 1, wherein the pre-configured container comprises an ISO shipping container.

3. The telescoping mast system of claim 1, wherein the first attachment mechanism corresponds to a top ISO corner block and the second attachment mechanism corresponds to a bottom ISO corner block vertically aligned with the top ISO corner block.

4. The telescoping mast system of claim 1, wherein the second section of the shaft is coupled to the mounting bracket, orienting the shaft parallel to the mounting bracket.

5. The telescoping mast system of claim 1, wherein the shaft is removably coupled to the mounting bracket, and the telescoping mast further comprises a locking mechanism to secure the shaft to the mounting bracket.

6. The telescoping mast system of claim 1, wherein the shaft is pivotably coupled to the mounting bracket at a pivot axis.

7. The telescoping mast system of claim 1, wherein the shaft is adjustable between an extended position with the first section disposed above the mounting bracket, and a retracted position with the first section disposed next to the mounting bracket.

8. The telescoping mast system of claim 1, wherein the accessory coupling mechanism is configured to couple to at least one of a camera, a wind turbine, an environmental sensor, a solar panel, an antennae, a light fixture, a transmitter or a receiver.

9. The telescoping mast system of claim 8, further comprising a conduit disposed in the shaft for routing a wire to at least one of the camera, the wind turbine, the environmental sensor, the solar panel, the antennae, the light fixture, the transmitter or the receiver.

10. The telescoping mast system of claim 1, wherein the first and second attachments are configured to couple to the pre-configured container, orienting the mounting bracket and the shaft vertically.

11. An accessory mounting bracket for coupling to an ISO shipping container comprising:
   a rigid elongated body;
   a top coupling mechanism disposed at a first distal end point of the rigid elongated body and extending perpendicularly from the rigid elongated body, the top coupling mechanism configured to couple to a first ISO corner block; and
   a bottom coupling mechanism disposed at a second distal end point opposite the first distal end point of the rigid elongated body and extending perpendicularly from the rigid elongated body, the bottom coupling mechanism vertically aligned with the top coupling mechanism, and the bottom coupling mechanism configured to couple to a second ISO corner block.

12. The accessory mounting bracket of 11, wherein the top coupling mechanism comprises a first pin actuated bolt and the bottom coupling mechanism comprises a second pin actuated bolt.

13. The accessory mounting bracket of claim 11, wherein the top coupling mechanism comprises a hook and the bottom coupling mechanism comprises a pin actuated bolt.

14. The accessory mounting bracket of claim 11, wherein at least one of the top coupling mechanism or the bottom coupling mechanism comprises a magnet.

15. The accessory mounting bracket of claim 11, wherein the rigid elongated body has a first length when the top and bottom coupling mechanisms are coupled to the ISO shipping container, and the rigid elongated body has a second length when the rigid elongated body is in a storage position, the second length being less than the first length.

16. The accessory mounting bracket of claim 11, further comprising a telescoping mast attached to the rigid elongated body between the top and bottom coupling mechanisms.

17. A shipping container accessory attachment system, comprising:
   an ISO shipping container having a top corner block and a bottom corner block disposed below the top corner block;
   a mount having a top portion removably coupled to the top corner block and a bottom portion removably coupled to the bottom corner block;
   a telescoping shaft coupled to the mount and aligned parallel to a line formed by the top corner block and the bottom corner block, the telescoping shaft having an extendable section configured to extend above a top plane of the ISO shipping container; and
   an accessory coupled to the extendable section.

18. The shipping container accessory attachment system of claim 17, wherein the accessory is communicatively coupled to equipment housed in the ISO shipping container.

19. The shipping container accessory attachment system of claim 17, wherein the telescoping shaft is retractable to a position with the extendable section disposed below the top plane of the ISO shipping container.

20. The shipping container accessory attachment system of claim 17, wherein the accessory comprises at least one of communication equipment, power generating equipment, environmental sensing equipment or surveillance equipment.

* * * * *